United States Patent [19]

Hanson

[11] 4,424,825
[45] Jan. 10, 1984

[54] FAST CLOSING VALVE

[75] Inventor: Clark L. Hanson, Livermore, Calif.

[73] Assignee: The United States of America as represented by the Department of Energy, Washington, D.C.

[21] Appl. No.: 205,397

[22] Filed: Nov. 10, 1980

[51] Int. Cl.³ .......................... F16K 5/20; F16K 31/04
[52] U.S. Cl. ........................................ 137/1; 251/129;
251/133; 251/136; 251/170; 251/188; 250/430
[58] Field of Search ............... 251/133, 170, 188, 192,
251/136, 129; 250/430, 289, 288; 137/1

[56] References Cited

U.S. PATENT DOCUMENTS

| | | | |
|---|---|---|---|
| 2,973,180 | 2/1961 | Morgan | 251/170 |
| 3,061,265 | 10/1962 | Schiegries | 251/159 X |
| 3,257,094 | 6/1966 | Vischer, Jr. | 251/133 |
| 3,387,748 | 6/1968 | Brenchley | 251/133 X |
| 3,485,475 | 12/1969 | Moore et al. | 251/188 X |
| 3,653,631 | 4/1972 | Hurst | 251/188 X |
| 4,215,722 | 8/1980 | Sigmon | 251/159 X |

FOREIGN PATENT DOCUMENTS 1213058 10/1959 France ........................... 251/159

*Primary Examiner*—Arnold Rosenthal
*Attorney, Agent, or Firm*—L. E. Carnahan; Roger S. Gaither; Richard G. Besha

[57] ABSTRACT

A valve is provided for protecting the high vacuum of a particle accelerator in the event of air leakage, wherein the valve provides an axially symmetrical passage to avoid disturbance of the partical beam during normal operation, and yet enables very rapid and tight closure of the beam-carrying pipe in the event of air leakage. The valve includes a ball member (30) which can rotate between a first position wherein a bore (32) in the member is aligned with the beam pipe, and a second position out of line with the pipe. A seal member (38) is flexibly sealed to the pipe, and has a seal end which can move tightly against the ball member after the bore has rotated out of line with the pipe, to thereby assure that the seal member does not retard rapid rotation of the ball valve member. The ball valve member can be rapidly rotated by a conductive arm (40) fixed to it and which is rotated by the discharge of a capacitor bank through coils (44, 45) located adjacent to the arm.

9 Claims, 5 Drawing Figures

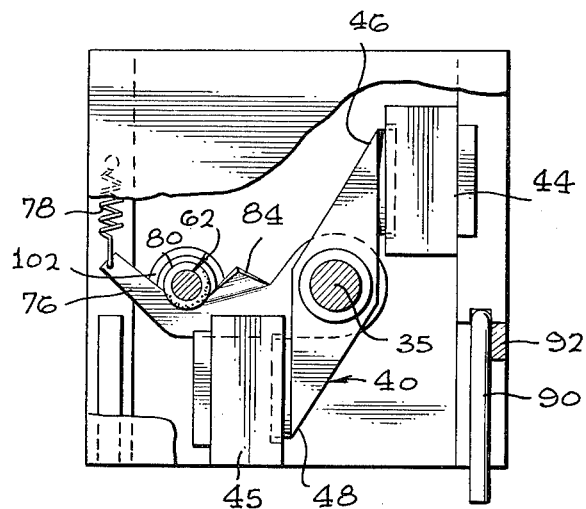
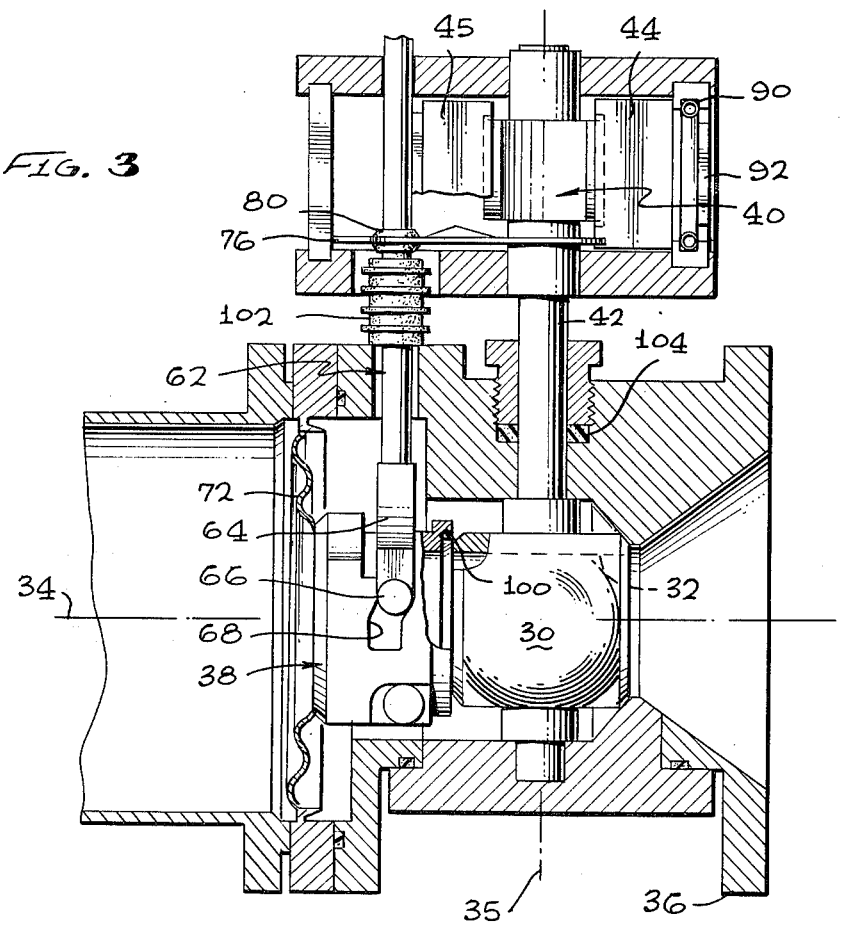

FAST CLOSING VALVE

ORIGIN OF THE INVENTION

The invention described herein resulted from Contract W-7405-ENGL-48 between the U.S. Dept. of Energy and the University of California.

BACKGROUND OF THE INVENTION

One type of particle accelerator includes an evacuated conduit or beam pipe for guiding a particle beam from an accelerator to an experimental set-up. The beam exits the pipe through a thin window of metal foil or plastic film. Rupture of the window produces a rapid inrush of air which can cause major damage to the accelerator equipment. To avoid such damage, most accelerators are equipped with a fast closing valve triggered by a pressure rise detector. However, such fast closing valves have had interior bores which were not symmetrical about the axis of the beam pipe, which results in disturbance of the particle beam. A fast closing valve which provided a valve bore that was symmetrical about the axis of the beam pipe during normal operation, and which enabled very rapid and tight closure of the beam pipe to prevent the inrush of air, would be of considerable value.

OBJECTS AND SUMMARY OF THE INVENTION

One object of the invention is to provide a valve which can be closed very rapidly and very tightly.

Another object is to provide a valving apparatus for use with an evacuated accelerator beam pipeline, for maintaining a vacuum in the accelerator side of the pipe after the onset of air leakage into the non-accelerator side of the pipe, without impairing the particle beam during normal operation of the accelerator system.

In accordance with one embodiment of the present invention, a valving apparatus is provided which can form an axially symmetrical opening along a conduit when the conduit is to be opened, and which can close the conduit very rapidly and very tightly when it is to be closed. The apparatus includes a ball valve member which can be rotated from an open position wherein a bore in the member is aligned with the conduit, to a closed position wherein the bore is out of line with the conduit. A seal member which is flexibly sealed to the conduit, can be moved against the valve member in its closed position to form a very tight seal thereagainst. The seal member is held away from the valve member during its rotation, so that the valve member can be rotated very rapidly and without damaging the seal member.

The valve member can be rapidly rotated by a pair of conductive arm parts fixed to a shaft of the valve member, a pair of electrical coils lying adjacent to the conductive arm parts, and a capacitor which can be rapidly discharged through the coils to produce large forces that repel the arm parts to rapidly rotate the valve member. The seal member can be moved by a spring device which is released after the arms have at least partially rotated the valve member and have hit a latch that prevented release of the spring device.

The novel features of the invention are set forth with particularity in the appended claims. The invention will best be understood from the following description when read in conjunction with the accompanying drawings.

BRIEF DESCRIPTION OF THE DRAWINGS

FIG. 2 is a partial sectional plan view of the apparatus of FIG. 1, shown with the valve in an open configuration.

FIG. 3 is a partial sectional view of the valve apparatus of FIG. 1 in an open configuration.

DESCRIPTION OF THE PREFERRED EMBODIMENT

Figure 1:
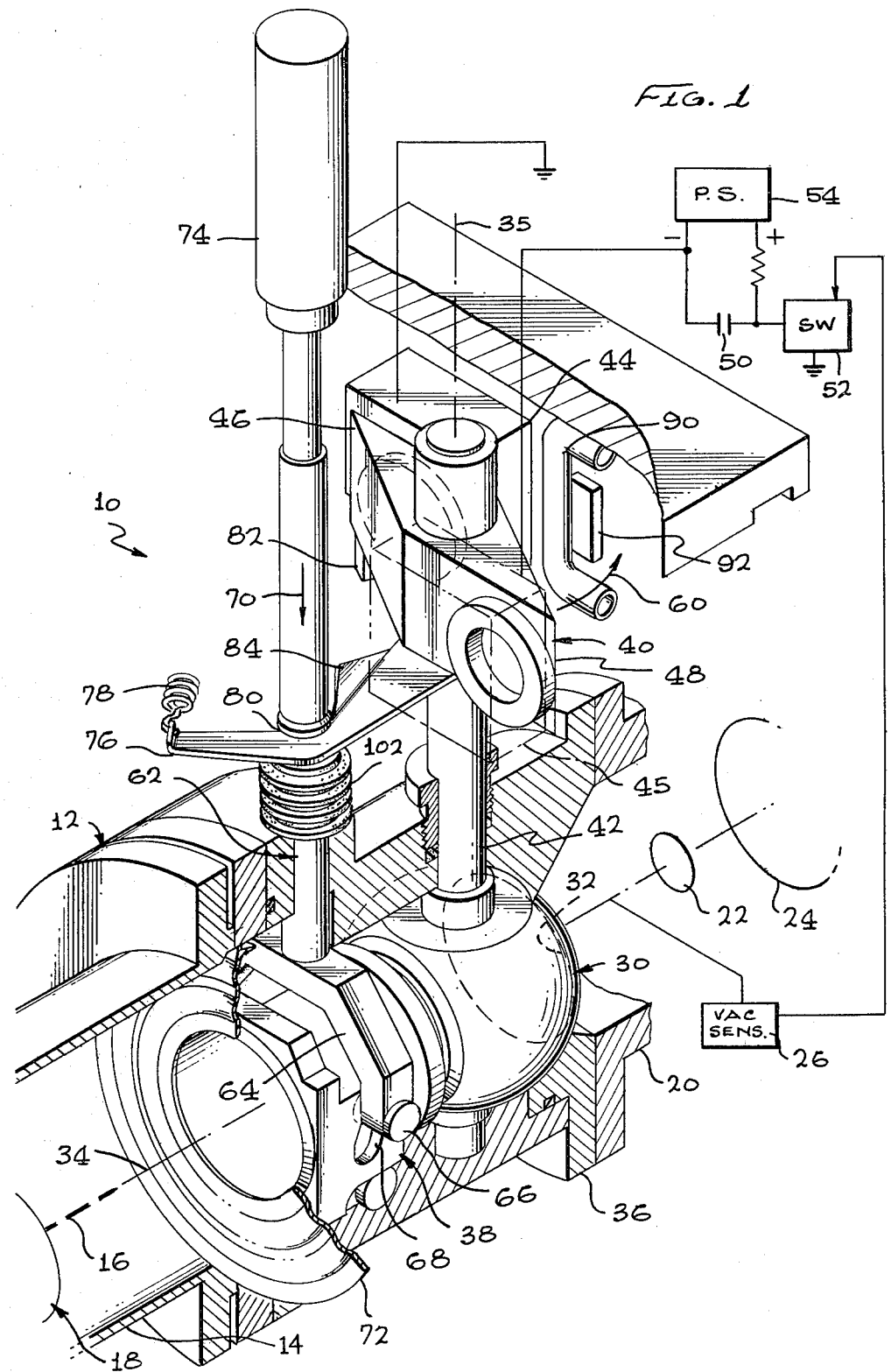
FIG. 1 is a partially sectional and perspective view of a fast closing valve apparatus constructed in accordance with an embodiment of the invention.
Figure 4:
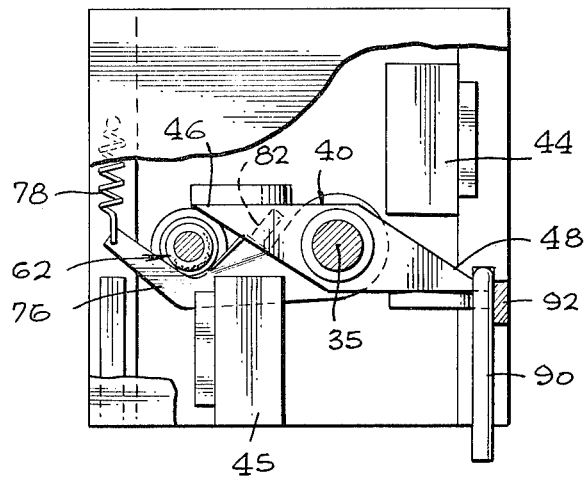
FIG. 4 is a partial sectional plan view of the apparatus of FIG. 2, but showing the valve in a closed configuration.

FIG. 1 illustrates a valve apparatus 10 which can be utilized to rapidly and tightly close a pipeline 12 which includes one conduit 14 that carries a particle beam 16 such as a beam of electrons generated by an accelerator 18, and which also includes a conduit 20 which delivers the beam through a window 22 to an experimental tank 24. The region within the pipeline is maintained at a high vacuum up to the window 22. The window 22 is of thin material such as pyrolytic graphite foil to facilitate passage of the beam therethrough, and the window is subject to rupture. The accelerator 18 must be protected against loss of vacuum that could seriously damage it, and the purpose of the valve apparatus 10 is to rapidly close the conduit 14 in the event of rupture of the window 22. Such rupture would cause an inrush of air that can be detected by a vacuum sensor 26 disposed along the conduit 20.

The valve apparatus 10 includes a ball valve member 30 which has a cylindrical bore 32 formed therethrough. During normal operation of the system, the axis of the bore 32 is aligned with the axis 34 of the conduit 14 along which the particle beam is directed. When the window 22 breaks and inrushing air is detected, the ball 30 is rapidly rotated about an axis 35 which is perpendicular to the length of the conduit, to a position wherein the bore 32 is out of line with the conduit 14. This prevents the rapid inrush of air through the bore 32 into the conduit 14. However, there is still a leakage of air through the gap between the ball valve member 30 and the valve housing 36 within which it rotates. To prevent such leakage of air around the ball valve member into the conduit 14, a seal 38 is provided which can be shifted to press tightly against the valve member 30 after rotation of the valve member out of line with the conduit.

Rapid rotation of the ball valve member 30 is produced by a rotating mechanism that includes a conductive arm 40 connected through a rotatable shaft 42 to the valve member 30, and a pair of solenoid coils 44, 45. Each coil lies adjacent to an opposite part 46 or 48 of the conductive arm 40, and the coils are connected in series with one another and with a capacitor bank 50 and a switch 52. The capacitor bank 50 is normally kept charged from a high voltage power supply 54. When the vacuum sensor 26 senses loss of the high vacuum, it triggers the switch 52 to a closed state, to discharge the capacitor 50 through the solenoid coils 44, 45. The very rapid increase in magnetic fields through the coils induces currents in the conductive arm 40 that generate magnetic fields causing the coils to repel the conductive arm parts 46, 48. As a result, the arm 40 rapidly rotates in a direction indicated by arrow 60, to turn the ball valve member 30 from its initial position to one wherein its bore 32 is out of line with the conduit 14.

The apparatus for moving the seal or seal member 38 against the ball valve member 30 after rotation of the ball member to its closed position, includes a camming member 62 which has a yoke end 64 with arms extending on either side of the seal member 38. A pin cam 66 on each yoke arm engages a cam follower 68 on the seal member. Accordingly, when the cam member 62 is moved down along the arrow 70, the pin cams 66 press the seal member 38 against the ball valve member 30 to seal thereagainst. The seal member 38 is flexibly sealed by a diaphragm to the conduit 14, to maintain a vacuum tight sealing therewith during slight shifting of the seal member against the ball valve member.

The downward movement of the cam member 62 to advance the seal member, is accomplished by a stored energy spring means 74, in the form of an air cylinder which is partially extended and has been charged to a high pressure. A latch 76 is held by a spring 78 so that it lies under a collar 80 on the cam member 62, to prevent downward movement of the cam member until the final sealing-closed of the valve is to be accomplished.

The latch 76 is pivotally mounted on the ball member shaft 42. When the conductive arm 40 rotates in the direction of arrow 60 to close the ball valve member, a lug 82 on one of the arm parts 46 strikes a raised lip 84 on the latch 76, to rotate the latch and release the cam member 62 to advance the seal 38 against the ball valve member.

The lut 82 on the pivoting conductive arm 40 does not strike the raised lip 84 on the latch to release the cam 62, until the conductive arm has pivoted far enough that the bore 32 of the valve member is in a largely closed condition. Accordingly, the seal member does not press on the ball valve member during substantial valve member rotation. This avoids retarding of the ball valve member from rotation by friction of the seal thereagainst, and also avoids damage to the seal by the rapid movement of the ball member across it. Of course, it is possible to release the cam early, so long as it is known that the ball valve member will be closed by the time the seal presses on it.

After the rotating conductive arm 40 has rotated the ball valve member closed and released the latch 76, the conductive arm must be stopped. Much of the energy is absorbed by a crushable tube 90 placed at the end of arm part 48. In addition, a scrapable member 92 is placed along the end portion of the path of each arm part, to be scraped by the arm part. The scraping of the member 92, which may be constructed of lead, not only absorbs some of the arm energy, but also serves as a latch to retain the arm in its rotated position and prevent it from bouncing back. Another crushable tube and scrapable member similar to 90 and 92 can be provided to stop the other arm part 46 of the conductive arm.

Figure 5:
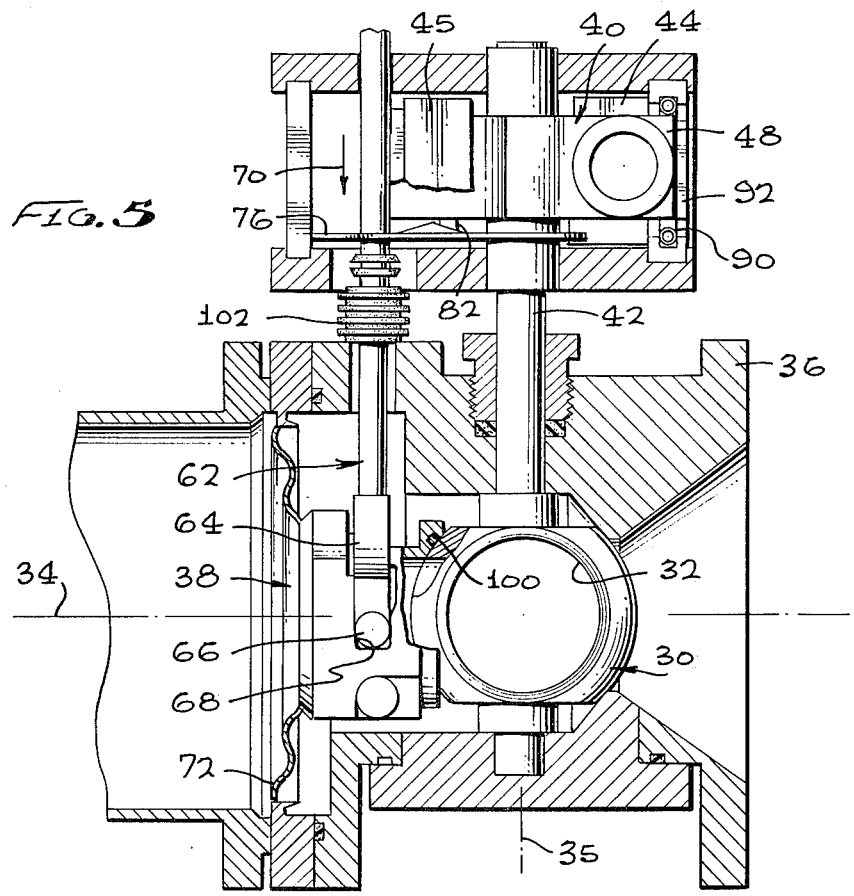
FIG. 5 is a sectional view similar to FIG. 3, but showing the valve in a closed configuration.

As shown in FIGS. 3 and 5, several sealing devices are provided to prevent the leakage of air. An end of the seal member 38 is provided with an O-ring 100 to form an air tight seal against the ball valve member 30 after the ball member has been rotated closed. A bellows 102 seals the cam 62 to the valve housing 36 during longitudinal movement of the cam. An O-ring seal 104 seals the ball member shaft 42 to the valve housing during rotation of the shaft.

The use of stored energy to rotate the ball valve member and to advance the seal against the valve member, enables very rapid movement of the devices. In one valve mechanism that was constructed as shown in the drawings, a ball valve member having a two-inch bore 32 was rotated from an opened to a closed position in less than five milliseconds. The capacitor bank 50 included six capacitors of 250 microfarads each, with each having a 1,500 volt capacity. The coils 44 were each formed with 10 turns of a 4 mm by 1.5 mm copper strip which was spirally wound, to produce an inductance in each coil of approximately two microhenrys. At a 1,500 volt charge of the capacitors, the total stored energy was 1,688 joule. The peak current measured through the coils with this charge was 24 kiloampere with a rise time of 100 microseconds. The closing time of the valve was measured for various stored energies at atmospheric pressure, using a light beam passing through the bore of the valve and illuminating a silicon photodetector. At a stored energy of 1,500 joule, the closing time was 3 milliseconds. The delay time between detection of a pressure rise by the vacuum sensor 26 and the closing of the switch 52 is less than one millisecond, so that the total time between detection of window rupture to valve closure is estimated to be less than 5 milliseconds in the above example. Additional time is required before the seal 38 moves tightly against the closed ball valve member, but there is a reduced leakage rate during this period. The stored energy in the compressed air cylinder 74 enables the seal 38 to also be moved rapidly to a closed condition, and maintains it tightly pressed against the ball valve member.

After activation of the valve, it can be reset (after replacing the broken window 22 and evacuating the downstream conduit 20) by manually returning the conductive arm 42 to its initial position, raising the cam 62, recharging the capacitor 50, and recharging the air cylinder 74 with air. In addition, the energy absorber tube 90 and scrapeable member 92 are replaced.

The use of a ball valve member 30 along a particle beam, is useful in avoiding local distortions of the beam. The above-described valve was designed and built for use in an accelerator that had a 10 kilioampere beam that was repetitively pulsed at intervals of 40 nanoseconds. This large varying flow of charged particles induces currents in the walls of the conduit through which it passes. It is desirable to place metal of the conduit and of the valve symmetrically about the axis 34 of the beam, to avoid disturbances of the beam caused by asymmetry. The use of a ball valve 30 enables a bore 32 to be utilized which is symmetrical about the beam axis or beam line 34. In addition, the use of a rotatable valve device helps achieve a reliable and rapid valve closure, since rotatable bearings are highly reliable, and the rotatable structure (including the ball valve member 30, shaft 52, and conductive arm 40) are of relatively small mass to enable their rapid movement. It may be noted that the term ball valve member refers to a type of member which has a bore and which is rotated to bring the bore in line or out of line with a conduit, and the member does not have to be in a simple spherical or ball shape.

Thus, the invention provides an apparatus for rapidly and tightly closing a conduit, and which is especially useful in safeguarding an evacuated beam pipe wherein nonsymmetrical pipe portions are undesirable. The apparatus includes a ball valve member that can be rotated to align its bore with the conduit or move its bore out of line with the conduit, and a seal member that is flexibly sealed to the conduit and that can be moved tightly against the valve member when the valve member has been turned to the closed position. Rapid rotation of the ball valve member can be accomplished by the use of a conductive arm fixed to the shaft of the ball valve member, and a coil that can be connected to a capacitor bank. Current from the capacitor produces a rapidly rising magnetic field in the coil that induces a current in the conductive member, to rapidly repel the conductive member from the coil and thereby rapidly rotate the ball valve member. The seal member can be rapidly moved against the ball valve member by the use of a stored energy biasing means that is released upon rotation of the ball valve member, to rapidly shift the seal member.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for closing a conduit comprising:
   a ball valve member lying in series with said conduit, and rotatable about an axis extending perpendicular to the length of an adjacent portion of the conduit, said valve member having a through hole positioned so it can be aligned with or moved out of line with said conduit as the member rotates about said axis;
   electrically activated means for rotating said valve member about said axis, said electrically activated means including a rotatable shaft extending along said axis and fixed to said valve member, said shaft having an electrically conductive member secured thereto, at least one coil assembly positioned adjacent said conductive member, and means for activating said coil assembly for rotating said shaft;
   a movable seal member lying between said valve member and said conduit and having a sealing end lying adjacent to said valve member so that when said seal member moves towards said valve member it can form a fluid-tight seal thereagainst, said seal member also being flexibly sealed to said conduit to seal to the conduit during at least some of its movement toward the valve member; and
   means for moving said seal member against said valve member after rotation of said valve member to a position wherein its bore is out of line with said conduit, said means for moving said seal member including a stored energy means coupled to said movable seal member for moving said seal member, said stored energy means being activated by said electrically activated means for rotating said valve member and being activated only after said valve member has been rotated.

2. The apparatus described in claim 1 wherein: said conductive member comprises a conductive arm fixed to said shaft, said coil assembly lying adjacent to said conductive arm, and said means for activating said coil assembly functions by applying a large current pulse to said coil assembly;
   said conductive arm including a pair of electrically conductive arm parts extending in different directions from the axis of said shaft, and said coil assembly including a pair of coils each positioned to be substantially against one of said arm parts so the repulsive force applied by each coil to an arm part urges the arm to rotate in a predetermined direction causing rotation of said rotatable shaft and rotation of said valve member.

3. The apparatus described in claim 2 including:
   a scrapable member of softer material than said arm parts, lying beside and partially in the path of one of said arm parts, to slow it by allowing the arm part to scrape the scrapeable member.

4. The apparatus described in claim 1 wherein:
   said means for moving said seal member additionally includes a camming member connected to said stored energy means and coupled to said seal member to move said seal member against said valve member when said camming member moves in a predetermined direction, spring means for rapidly moving said camming member in said direction, a latch holding said camming member against movement in said direction, and means for releasing said latch only after said valve member has been rotated to a position wherein said hole is out of line with said conduit, whereby said seal member is moved by said stored energy means.

5. Apparatus for use with an evacuated accelerator beam pipe, for maintaining the vacuum in the accelerator side of the pipe after the onset of leakage of air into the non-accelerator side of the pipe, which comprises:
   a ball valve member positioned in the beam pipe, and having a bore through which the accelerator beam can normally pass;
   electrically activated means for rapidly rotating the valve member from a position wherein said bore is aligned with said pipe to a position out of alignment therewith, said electrically activated means including a rotatable electrically conductive member operatively connected to said valve member, and means for activating said rotatable conductive member causing rotation of said valve member;
   a seal flexibly sealed to the accelerator side of the pipe and moveable against the valve member to form a seal thereagainst; and
   stored energy means operatively connected via a camming member to said seal and activated by said means for rotating said valve member for moving said seal against said valve member only after said valve member has rotated far enough for said bore to lie out of alignment with said pipe.

6. The apparatus described in claim 5 wherein:
   said electrically activated means for rapidly rotating said valve member includes a charged capacitor, a coil connectable to said capacitor, said conductive member includes an arm of conductive material connected to said valve member and lying adjacent to said coil to be moved by a surge of current through said coil; and
   said stored energy means for moving said seal includes a stored energy device, a releasable latch which prevents movement of said device, and means moved by said arm for releasing said latch.

7. Apparatus for rapidly closing an accelerator beam conduit, comprising:
   a ball valve housing lying adjacent to said conduit;
   a ball valve member rotatably mounted in said housing about an axis extending substantially perpendicular to said conduit, and having a bore which can be aligned with or moved out of line with said conduit as said valve member is turned;

a seal member lying between said conduit and said valve member and having an end adjacent to said valve member, said seal member being shiftable to move said seal member end against and away from said valve member;

means for sealing said conduit to said seal member during shifting of the seal member;

a valve member rotating mechanism which includes a shaft fixed to said valve member and extending along said axis, and a conductive arm fixed to said shaft and having a pair of opposite arm parts extending in opposite directions from said axis;

a pair of electrical coils positioned to lie substantially against said arm parts;

a capacitor device for storing electricity;

switch means for connecting said capacitor device to said coils, to energize the coils and thereby rotate the arm and the valve member;

a cam moveable in a first direction against said seal member to shift said seal member so that said seal member end moves against said valve member;

a stored energy device urging said cam member to move in said first direction; and a latch positioned to prevent movement of said cam in said first direction and positioned in the path of said valve member rotating mechanism to be moved thereby to release said cam to move said seal member, when said valve member has rotated to a position at which its bore is out of line with said conduit.

8. A method for rapidly closing a conduit, comprising the steps of:

activating an electrical mechanism for rapidly rotating a ball valve member from a first position wherein a bore therein is aligned with the conduit to a position wherein the bore is out of alignment with the conduit;

maintaining a seal member between the conduit and valve member and flexibly sealed to said conduit, but with the seal member spaced from the valve member during rotation of the valve member away from said first position;

activating stored energy means operatively connected to said seal member and to said electrical mechanism for shifting said seal member against said valve member only after said valve member has rotated so its bore is substantially out of alignment with said conduit;

said step of rapidly rotating a valve member including electrically discharging a capacitor through at least one coil to rotate an arm fixed to the valve member and lying adjacent to said coil; and said step of shifting said seal member including releasing a catch to allow said stored energy means to rapidly move the seal member.

9. A method for operating a valving apparatus for use with an evacuated accelerator beam pipe for maintaining a vacuum in the accelerator side of the beam pipe after the onset of air leakage into the non-accelerater side of the beam pipe, without impairing passage of a particle beam through the beam pipe, comprising the steps of:

maintaining a ball valve member having a bore with bore walls symmetrical to the axis of the beam pipe, in line with said beam pipe;

activating electrical mechanism for rapidly rotating the bore of the ball valve member out of alignment with the beam pipe;

said step of activating electrical mechanism including electrically discharging a capacitor through at least one coil to rotate an arm fixed to the valve member and lying adjacent to said coil;

maintaining a seal member flexibly sealed to the beam pipe, and with an end spaced from the valve member during at least initial valve member rotation; and activating stored energy means operatively connected to the electrical mechanism for operating the ball valve member and operatively connected to the seal member for shifting the seal member end against the valve member only after the bore thereof is substantially out of alignment with the beam pipe.

* * * * *